(12) United States Patent
Nagata

(10) Patent No.: US 12,723,645 B2
(45) Date of Patent: Sep. 1, 2026

(54) DRIVE DEVICE FOR VEHICLE

(71) Applicant: TOYOTA JIDOSHA KABUSHIKI KAISHA, Toyota (JP)

(72) Inventor: Shohei Nagata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/782,252

(22) Filed: Jul. 24, 2024

(65) Prior Publication Data

US 2025/0155012 A1 May 15, 2025

(30) Foreign Application Priority Data

Nov. 13, 2023 (JP) ................................ 2023-192934

(51) Int. Cl.
*F16H 57/04* (2010.01)
*B60K 7/00* (2006.01)
*B60K 17/04* (2006.01)
*F16H 57/02* (2012.01)
*F16H 57/021* (2012.01)

(52) U.S. Cl.
CPC ....... *F16H 57/0424* (2013.01); *B60K 7/0007* (2013.01); *B60K 17/043* (2013.01); *F16H 57/021* (2013.01); *F16H 57/0471* (2013.01); *B60K 2007/0061* (2013.01); *F16H 2057/02034* (2013.01); *F16H 2057/02052* (2013.01)

(58) Field of Classification Search
CPC ............... F16H 57/0424; F16H 57/021; F16H 57/0471; F16H 2057/02034; F16H 2057/02052; B60K 7/0007; B60K 17/043; B60K 2007/0061
See application file for complete search history.

(56) References Cited

U.S. PATENT DOCUMENTS 9,850,999 B2 * 12/2017 Tahara ................ F16H 57/0424

FOREIGN PATENT DOCUMENTS

JP 2016188651 A * 11/2016
JP 2016-205444 A 12/2016

* cited by examiner

*Primary Examiner* — James A Shriver, II
*Assistant Examiner* — William Richard Brenner
(74) *Attorney, Agent, or Firm* — SoraIP, Inc.

(57) ABSTRACT

The drive device includes a first motor, a first gear mechanism, a second motor, a second gear mechanism, and a casing. The casing has a first gear chamber for accommodating the first gear mechanism, a second gear chamber for accommodating the second gear mechanism, and a partition wall interposed between the first gear chamber and the second gear chamber. The first gear chamber and the second gear chamber are arranged in a right-left direction of the vehicle, with the partition wall interposed therebetween. The partition wall is provided with a first communication passage that allows lubricating liquid retained in a lower portion of the first gear chamber to flow to the second gear chamber, and a second communication passage that allows lubricating liquid retained in a lower portion of the second gear chamber to flow to the first gear chamber, independently of each other.

5 Claims, 4 Drawing Sheets

DRIVE DEVICE FOR VEHICLE

CROSS-REFERENCE TO RELATED APPLICATION

This application claims priority to Japanese Patent Application No. 2023-192934 filed on Nov. 13, 2023, incorporated herein by reference in its entirety.

BACKGROUND

1. Technical Field

The technology disclosed in the present specification relates to a drive device for a vehicle.

2. Description of Related Art

Japanese Unexamined Patent Application Publication No. 2016-205444 (JP 2016-205444 A) describes a drive device for a vehicle. This drive device drives right and left wheels independently, by two motors. A casing of the drive device has two gear chambers, and the two gear chambers are arranged in a vehicle right-left direction, with the partition wall interposed therebetween.

SUMMARY

In a drive device for a vehicle, there is a problem that lubricating liquid in gear chambers is biased by centrifugal force when the vehicle turns. In particular, in the drive device as described above, the lubricating liquid moves toward the partition wall in one gear chamber, while the lubricating liquid moves away from the partition wall in the other gear chamber. As a result, in the other gear chamber, there is a concern that the lubricating liquid will be insufficient for bearings and gears located in the vicinity of the partition wall.

The present specification provides technology for sufficiently lubricating a vicinity of a partition wall in a drive device having two gear chambers, even when a vehicle turns.

The technology disclosed in the present specification is embodied in a drive device for a vehicle. In one embodiment thereof, the drive device includes a first motor for driving a right wheel of the vehicle, a first gear mechanism interposed between the first motor and the right wheel, a second motor for driving a left wheel of the vehicle, a second gear mechanism interposed between the second motor and the left wheel, and a casing that accommodates the first gear mechanism and the second gear mechanism together with a lubricating liquid.

The casing includes a first gear chamber for accommodating the first gear mechanism, a second gear chamber for accommodating the second gear mechanism, and a partition wall interposed between the first gear chamber and the second gear chamber. The first gear chamber and the second gear chamber are arranged in a right-left direction of the vehicle, with the partition wall interposed therebetween.

The partition wall is provided with a first communication passage that allows lubricating liquid retained in a lower portion of the first gear chamber to flow to the second gear chamber, and a second communication passage that allows lubricating liquid retained in a lower portion of the second gear chamber to flow to the first gear chamber, independently of each other.

According to the above-described configuration, regardless of whichever direction the vehicle turns in, the vicinity of the partition wall can be reliably lubricated. For example, assumption will be made that the vehicle turns to the right. In this case, the lubricating liquid moves toward the partition wall in the first gear chamber, while the lubricating liquid moves away from the partition wall in the second gear chamber. As a result, in the second gear chamber, a liquid level of the lubricating liquid decreases in the vicinity of the partition wall, but the lubricating liquid concentrated at the partition wall in the first gear chamber is supplied to the second gear chamber through the first communication passage provided in the partition wall. Similarly, when the vehicle turns to the left, the lubricating liquid concentrated at the partition wall in the second gear chamber is supplied to the first gear chamber through the second communication passage provided in the partition wall. Accordingly, regardless of whichever direction the vehicle turns in, the vicinity of the partition wall can be reliably lubricated.

In the above embodiment, the first communication passage may include a first inlet opening to the first gear chamber, and a first outlet opening to the second gear chamber, in which the first inlet is located above the first outlet.

Similarly, the second communication passage may include a second inlet opening to the second gear chamber, and a second outlet opening to the first gear chamber, in which the second inlet is located above the second outlet.

According to such a configuration, the lubricating liquid is smoothly supplied from the first gear chamber to the second gear chamber or from the second gear chamber to the first gear chamber in accordance with not only action of centrifugal force but also the liquid level difference of the lubricating liquid on both sides of the partition wall.

In the above embodiment, the first communication passage may be inclined downward from the first inlet toward the first outlet.

Similarly, the second communication passage may be inclined downward from the second inlet toward the second outlet.

According to such a configuration, the lubricating liquid is more smoothly supplied from the first gear chamber to the second gear chamber or from the second gear chamber to the first gear chamber by using gravity acting on the lubricating liquid.

In the above embodiment, in the first gear chamber, the partition wall may be provided with a first bearing holding portion for holding a bearing of the first gear mechanism. In this case, the second outlet of the second communication passage may be located at the first bearing holding portion.

Similarly, in the second gear chamber, the partition wall may be provided with a second bearing holding portion for holding a bearing of the second gear mechanism. In this case, the first outlet of the first communication passage may be located at the second bearing holding portion.

According to such a configuration, the bearing held by the partition wall can be lubricated more reliably.

In the above embodiment, the first bearing holding portion and the second bearing holding portion may be coaxially located with the partition wall interposed therebetween.

However, as another embodiment, the first bearing holding portion and the second bearing holding portion may be located apart from each other. In this case, the first communication passage and the second communication passage may also be provided apart from each other, in accordance with positions of these bearing holding portions.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
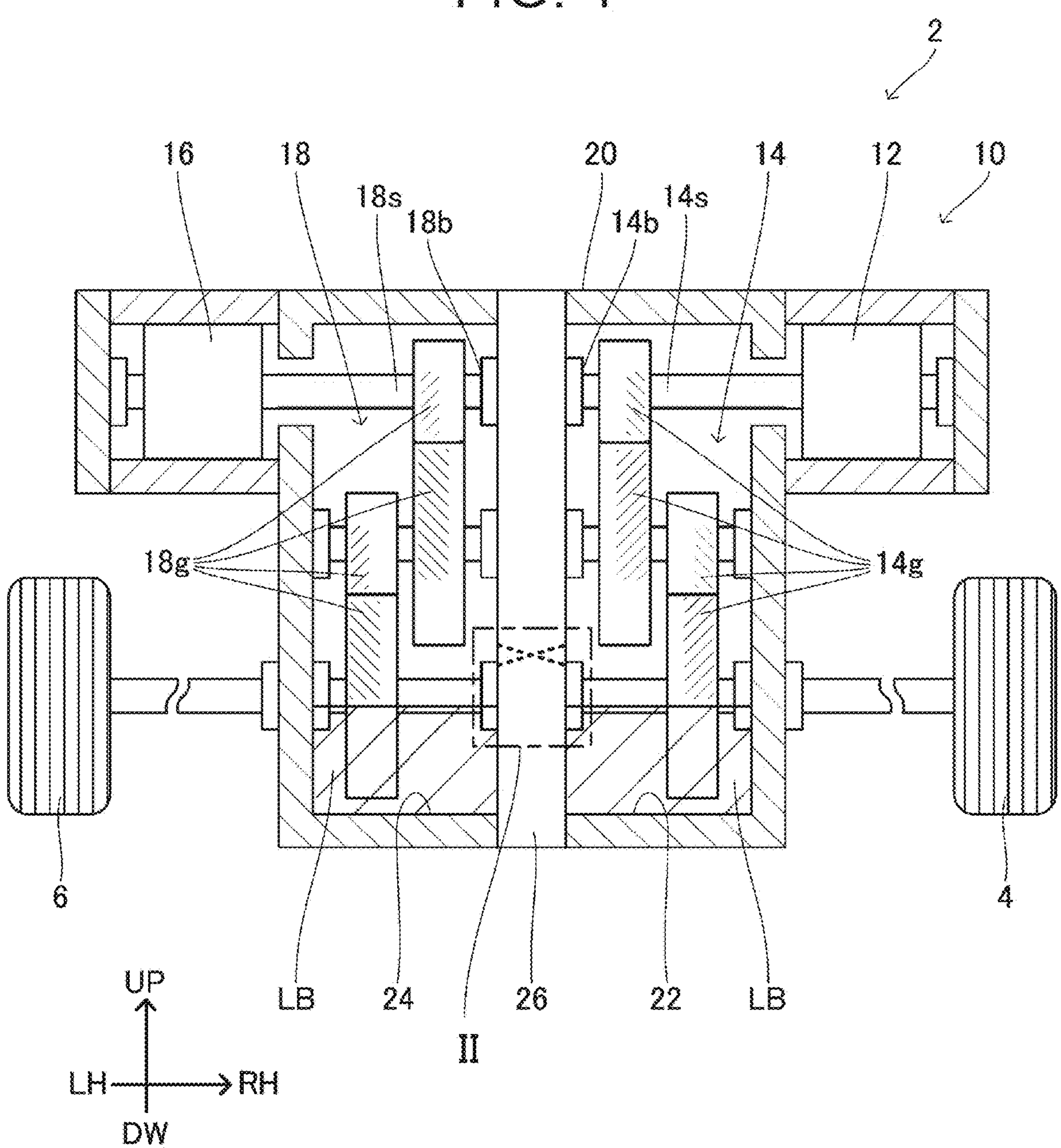
FIG. 1 schematically illustrates a configuration of a drive device 10 according to an embodiment.

The drive device 10 of the embodiment will be described with reference to the drawings. The drive device 10 is a drive device for the vehicle 2. The vehicle 2 is an electrified vehicle. The term "electrified vehicle" as used herein refers to, for example, a battery electrified vehicle, a hybrid-type electrified vehicle, a plug-in hybrid electrified vehicle or a fuel cell electrified vehicle. The drive device 10 is mounted on the vehicle 2 and drives the right wheel 4 and the left wheel 6 of the vehicle 2. The right wheel 4 and the left wheel 6 are arranged coaxially. The right wheel 4 and the left wheel 6 may be front wheels of the vehicle 2 or rear wheels of the vehicle 2.

In the drawings, the direction UP indicates an upward direction in the up-down direction of the vehicle 2, and the direction DW indicates a downward direction in the up-down direction. The direction RH indicates a right direction in the left-right direction of the vehicle 2, and the direction LH indicates a left direction in the left-right direction. The direction FR indicates the front in the front-rear direction of the vehicle 2, and the direction RR indicates the rear in the front-rear direction.

Figure 2:
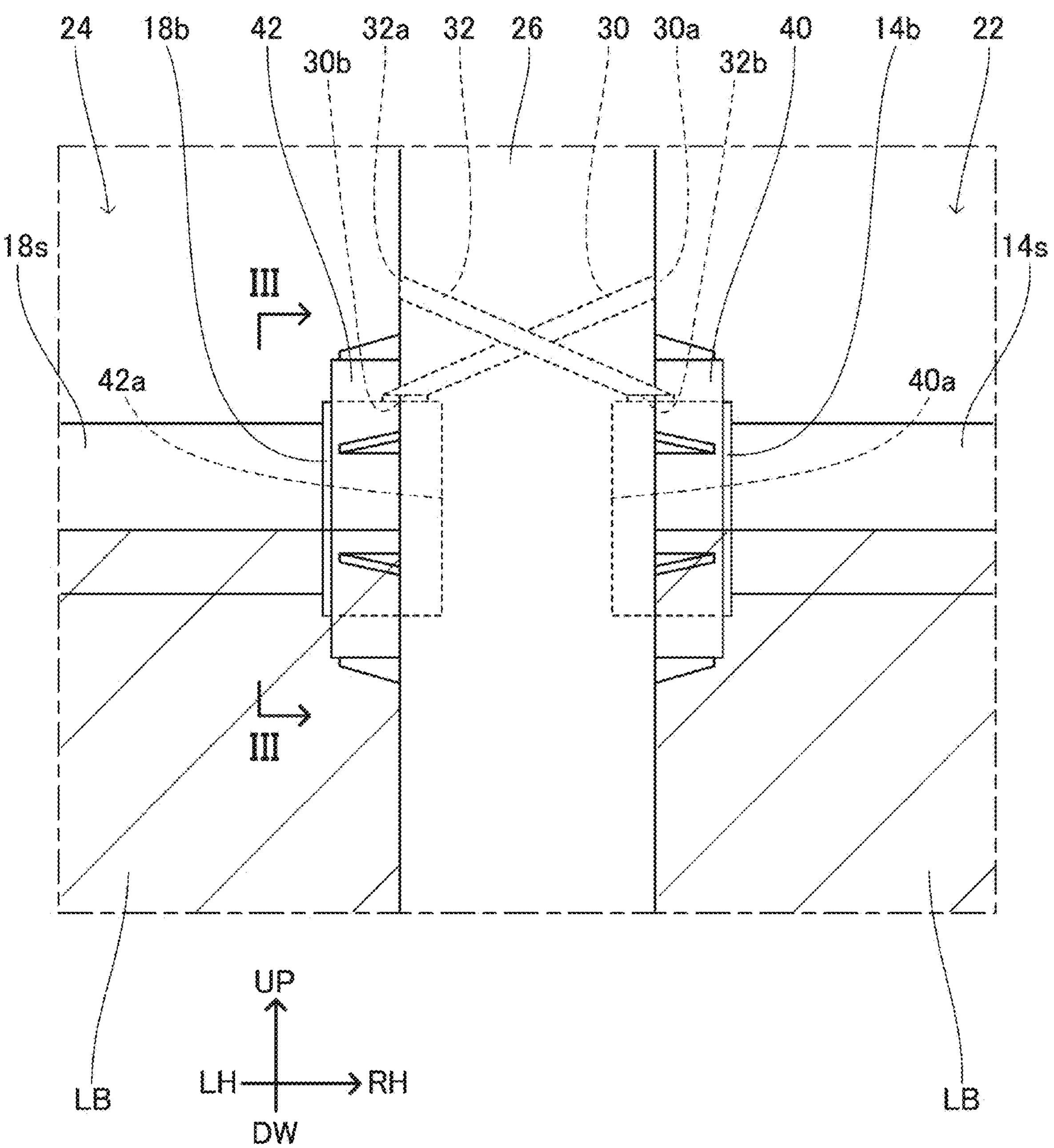
FIG. 2 shows an enlarged view of II in FIG. 1.
Figure 3:
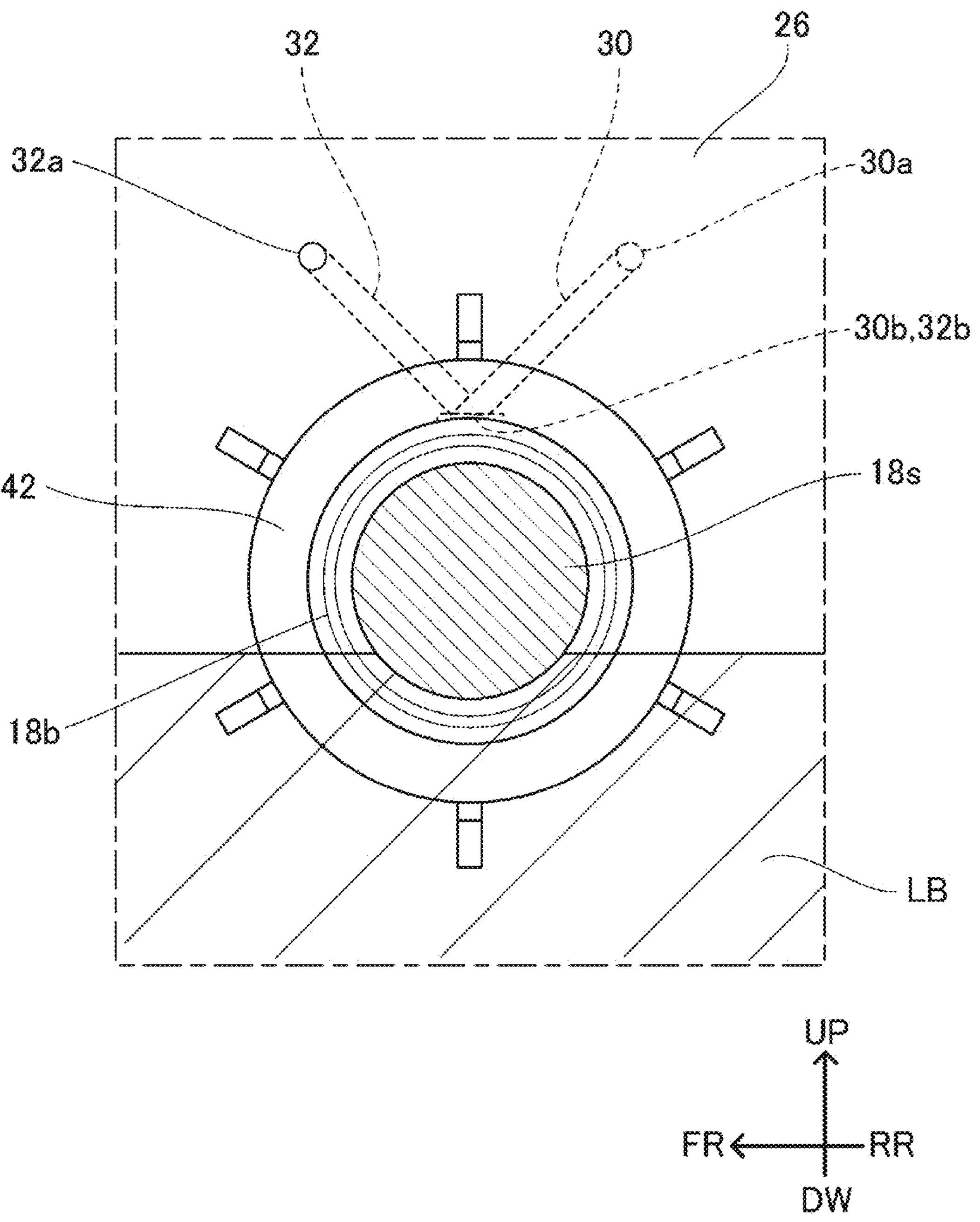
FIG. 3 is a cross-sectional view taken along III-III line in FIG. 2.

As illustrated in FIGS. 1 to 3, the drive device 10 includes a first motor 12, a first gear mechanism 14, a second motor 16, and a second gear mechanism 18. The first motor 12 is a prime mover for driving the right wheel 4 of the vehicle 2. The first motor 12 is connected to the right wheel 4 via the first gear mechanism 14. The second motor 16 is a prime mover for driving the left wheel 6 of the vehicle 2. The second motor 16 is connected to the left wheel 6 via a second gear mechanism 18. The drive device 10 is configured to drive the right wheel 4 and the left wheel 6 independently by two motors 12 and 16.

The first gear mechanism 14 is interposed between the first motor 12 and the right wheel 4. The first gear mechanism 14 includes a plurality of gears **14*g*, a plurality of rotating shafts 14*s*, and a plurality of bearings 14*b*. The plurality of gears 14*g* is engaged in series and transmit torques between the first motor 12 and the right wheel 4. Each rotating shaft 14*s* can hold at least one gear 14*g* and is rotatably supported by two or more bearing 14*b*. Although not particularly limited, the first gear mechanism 14 may be a speed reducer, and may be configured to amplify the torque output from the first motor 12 and transmit the amplified torque to the right wheel 4**.

The second gear mechanism 18 is interposed between the second motor 16 and the left wheel 6. The second gear mechanism 18 includes a plurality of gears **18*g*, a plurality of rotating shafts 18*s*, and a plurality of bearings 18*b*. The plurality of gears 18*g* is engaged in series and transmit torque between the second motor 16 and the left wheel 6. Each rotating shaft 18*s* holds at least one gear 18*g* and is rotatably supported by two or more bearings 18*b*. The second gear mechanism 18 may be a speed reducer, and may be configured to amplify the torque output from the second motor 16 and transmit the amplified torque to the left wheel 6**.

The drive device 10 further includes a casing 20. The casing 20 houses the first motor 12, the first gear mechanism 14, the second motor 16, and the second gear mechanism 18 together with the lubricating liquid LB. The lubricating liquid LB may be, for example, an oil. The casing 20 includes a first gear chamber 22, a second gear chamber 24, and a partition wall 26. The first gear chamber 22 houses the first gear mechanism 14, and the second gear chamber 24 houses the second gear mechanism 18. Lubricating liquid LB is retained in the lower portions of the first gear chamber 22 and the second gear chamber 24. The lubricating liquid LB is supplied to various places in the casing 20 by rotating the gear **14*g*, 18*g*** or by an oil pump (not shown).

The partition wall 26 is interposed between the first gear chamber 22 and the second gear chamber 24. The first gear chamber 22 and the second gear chamber 24 are arranged in the left-right direction with the partition wall 26 interposed therebetween. As shown in FIGS. 2 and 3, the partition wall 26 is provided with a first communication passage 30 and a second communication passage 32. The first communication passage 30 has a first inlet **30*a* opening into the first gear chamber 22 and a first outlet 30*b* opening into the second gear chamber 24, and extends from the first inlet 30*a* to the first outlet 30*b*. On the other hand, the second communication passage 32 has a second inlet 32*a* that opens into the second gear chamber 24 and a second outlet 32*b* that opens into the first gear chamber 22, and extends from the second inlet 32*a* to the second outlet 32*b*. Here, the first communication passage 30 and the second communication passage 32 are independent of each other, and are not connected to each other by the partition wall 26**.

Figure 4:
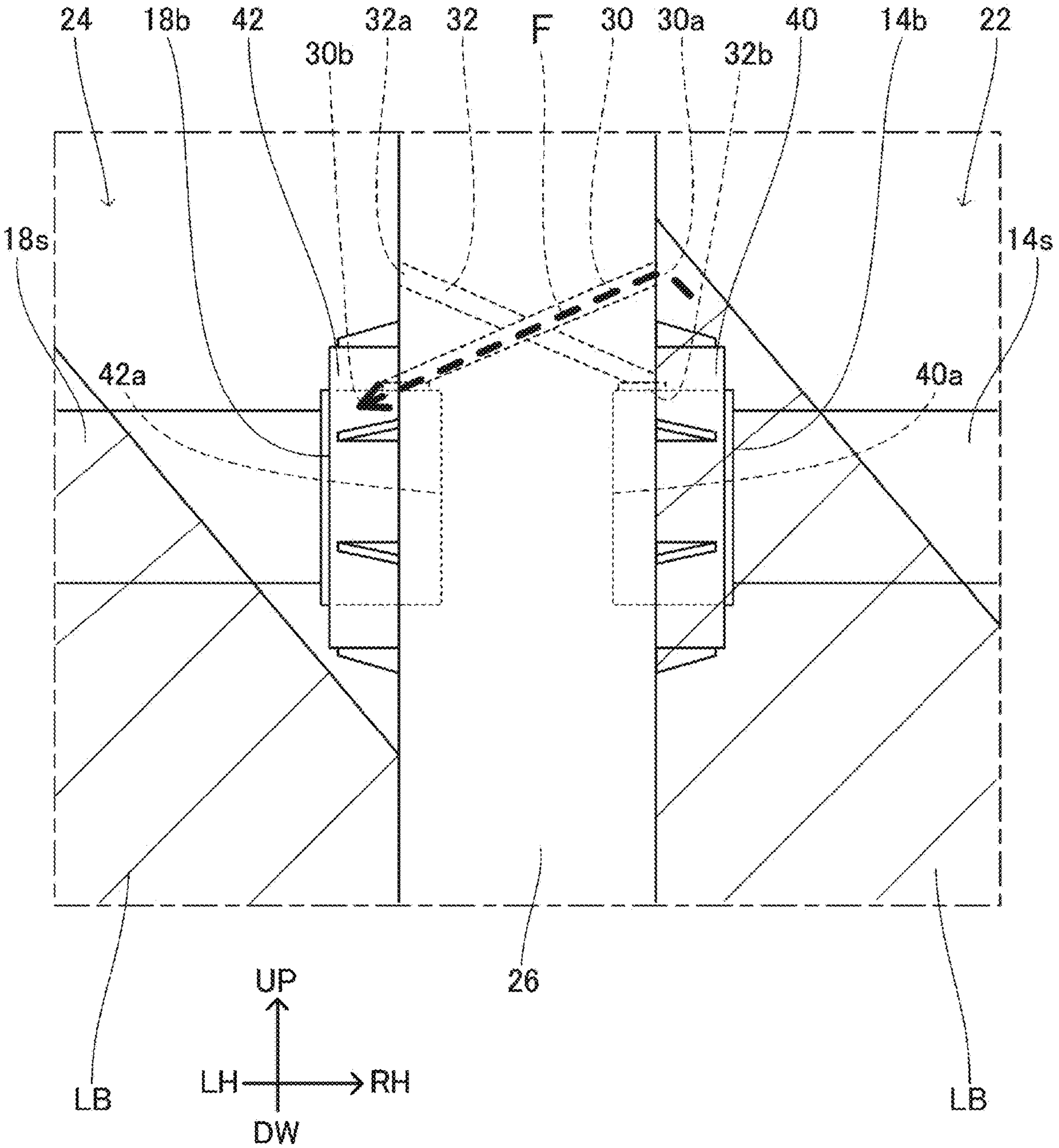
FIG. 4 shows the movement of the lubricating liquid LB during a right turn of the vehicle 2.

According to the above-described configuration, even when the vehicle 2 turns in any direction, the vicinity of the partition wall 26 can be reliably lubricated. For example, it is assumed that the vehicle 2 turns in the rightward RH. Here, as shown in FIG. 4, the lubricating liquid LB moves toward the partition wall 26 in the first gear chamber 22, whereas the lubricating liquid LB moves away from the partition wall 26 in the second gear chamber 24. Consequently, in the second gear chamber 24, the liquid level of the lubricating liquid LB is lowered in the vicinity of the partition wall 26. However, the lubricating liquid LB concentrated in the partition wall 26 in the first gear chamber 22 is supplied to the second gear chamber 24 through the first communication passage 30 provided in the partition wall 26 (see arrow F). Similarly, when the vehicle 2 turns in the left LH, the lubricating liquid LB concentrated in the partition wall 26 in the second gear chamber 24 is supplied to the first gear chamber 22 through the second communication passage 32 provided in the partition wall 26. Therefore, even when the vehicle 2 turns in any direction, the vicinity of the partition wall 26 can be reliably lubricated.

Although not particularly limited, the first inlet **30*a* may be located above the first outlet 30*b*. The first communication passage 30 may be inclined downward from the first inlet 30*a* toward the first outlet 30*b*. Similarly, the second inlet 32*a* may be located above the second outlet 32*b*. The second communication passage 32 may be inclined downward from the second inlet 32***a* toward the second outlet 32*b*. According to such a configuration, the lubricating liquid LB is smoothly supplied from the first gear chamber 22 to the second gear chamber 24 or from the second gear chamber 24 to the first gear chamber 22 in accordance with the liquid level differences of the lubricating liquid LB on both sides of the partition wall 26 as well as the action of the centrifugal force acting on the lubricating liquid LB.

However, as another embodiment, the first inlet 30*a* and the first outlet 30*b* may be at the same position in the vertical direction, and the first communication passage 30 may extend in the horizontal direction. Even in this situation, when the vehicle 2 turns clockwise, the lubricating liquid LB is supplied from the first gear chamber 22 to the second gear chamber 24 through the first communication passage 30 by the centrifugal force acting on the lubricating liquid LB. Similarly, even if the second communication passage 32 extends horizontally, when the vehicle 2 turns to the left, the lubricating liquid LB is supplied from the second gear chamber 24 to the first gear chamber 22 through the second communication passage 32.

Although not particularly limited, in the drive device 10 of the present embodiment, the second outlet 32*b* of the second communication passage 32 is located in the first bearing holding portion 40 in the first gear chamber 22. The first bearing holding portion 40 is provided on the partition wall 26, and holds the bearing 14*b* of the first gear mechanism 14. Specifically, the first bearing holding portion 40 has a recessed portion 40*a* into which the bearing 14*b* is fitted, and the second outlet 32*b* of the second communication passage 32 opens into the recessed portion 40*a*. According to such a configuration, the bearing 14*b* of the first gear mechanism 14 held by the partition wall 26 can be lubricated more reliably.

Similarly, in the second gear chamber 24, the first outlet 30*b* of the first communication passage 30 is located in the second bearing holding portion 42. The second bearing holding portion 42 is provided on the partition wall 26, and holds the bearing 18*b* of the second gear mechanism 18. Specifically, the second bearing holding portion 42 has a recessed portion 42*a* into which the bearing 18*b* is fitted, and the first outlet 30*b* of the first communication passage 30 opens into the recessed portion 42*a*. According to such a configuration, the bearing 18*b* of the second gear mechanism 18 held by the partition wall 26 can be lubricated more reliably. The second bearing holding portion 42 is positioned coaxially with the first bearing holding portion 40 with the partition wall 26 interposed therebetween.

Although the embodiment of the present technology has been described in detail above, the embodiment is merely an example and does not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A drive device for a vehicle, the drive device comprising:

a first motor for driving a right wheel of the vehicle;

a first gear mechanism interposed between the first motor and the right wheel;

a second motor for driving a left wheel of the vehicle;

a second gear mechanism interposed between the second motor and the left wheel; and a casing that accommodates the first gear mechanism and the second gear mechanism together with a lubricating liquid, wherein:

the casing includes a first gear chamber for accommodating the first gear mechanism, a second gear chamber for accommodating the second gear mechanism, and a partition wall interposed between the first gear chamber and the second gear chamber;

the first gear chamber and the second gear chamber are arranged in a right-left direction of the vehicle, with the partition wall interposed therebetween; and the partition wall is provided with a first communication passage that allows lubricating liquid retained in a lower portion of the first gear chamber to flow to the second gear chamber, and a second communication passage that allows lubricating liquid retained in a lower portion of the second gear chamber to flow to the first gear chamber, independently of each other.

2. The drive device according to claim 1, wherein:

the first communication passage includes a first inlet opening to the first gear chamber, and a first outlet opening to the second gear chamber, in which the first inlet is located above the first outlet; and the second communication passage includes a second inlet opening to the second gear chamber, and a second outlet opening to the first gear chamber, in which the second inlet is located above the second outlet.

3. The drive device according to claim 2, wherein:

the first communication passage is inclined downward from the first inlet toward the first outlet; and the second communication passage is inclined downward from the second inlet toward the second outlet.

4. The drive device according to claim 2, wherein:

in the first gear chamber, the partition wall is provided with a first bearing holding portion for holding a bearing of the first gear mechanism, and also the second outlet of the second communication passage is located at the first bearing holding portion; and in the second gear chamber, the partition wall is provided with a second bearing holding portion for holding a bearing of the second gear mechanism, and also the first outlet of the first communication passage is located at the second bearing holding portion.

5. The drive device according to claim 4, wherein the first bearing holding portion and the second bearing holding portion are coaxially located with the partition wall interposed therebetween.

* * * * *